Patented Apr. 25, 1950

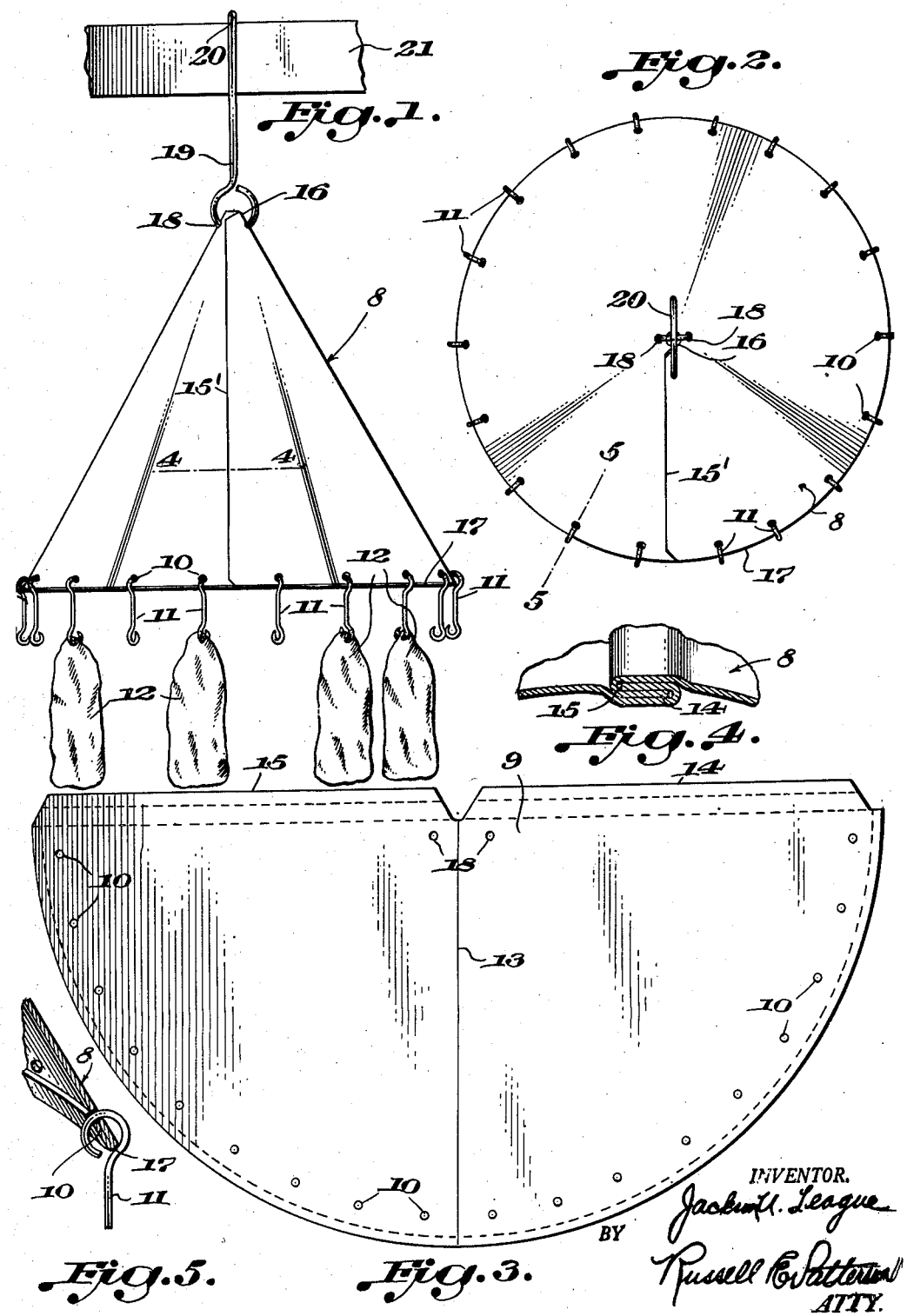

2,505,159

UNITED STATES PATENT OFFICE 2,505,159

MEAT HANGER

Jackson U. Teague, Powellsville, N. C.

Application July 17, 1946, Serial No. 684,291

1 Claim. (Cl. 211—113)

The present invention relates to improvements in meat hangers.

The primary object of the invention is to provide a support or hanger of simple and inexpensive construction, designed particularly for hanging meats, such as sausage and hams, while curing or being stored, and which is so constructed as to prevent rodents and the like from coming into contact therewith.

Another object of the invention is to provide a meat hanger of the above character embodying means whereby it may be conveniently suspended from a beam or rafter such as is found in meat curing houses.

A further object of the invention is to provide a cone-shaped meat hanger preferably formed of a light-weight metal, the base portion of which supports in spaced relation the meat to be cured or stored.

The above and other objects of the invention will in part be obvious and will in part be hereinafter more fully pointed out.

In the drawing,

Figure 1 is a front elevational view of the invention, the same being shown supporting meat being cured and suspended from a beam or rafter;

Figure 2 is a top plan view thereof;

Figure 3 is a plan view of the metal blank from which the hanger is formed;

Figure 4 is a detail sectional view taken substantially on line 4—4 of Figure 1;

Figure 5 is a detail sectional view taken substantially on line 5—5 of Figure 2.

Referring to the drawing for a more detailed description thereof, the new and improved meat hanger is generally designated by the reference numeral 8 and, as shown in Figure 1, is substantially cone-shaped. The hanger 8 is preferably formed of a light-weight metal from a blank of material 9 shaped as shown in Figure 3. The outer circumferential edge of this strip of material 9 is formed with a series of spaced openings 10 adapted to accommodate hooks 11 from which the meat 12 is suspended.

In the formation of the cone-shaped hanger 8, the material 9 is folded on the seam 13 so as to cause the edges 14 and 15 to overlap and interengage to form the seam 15', shown in Figure 4 of the drawing. The interlocked seam 15' is united in any desired manner. The particular formation of the blank of material 9 and the manner in which it is folded provides a cone-shaped hanger 8 having an angle of approximately 60° from the apex 16 to the base portion 17. This particular angularity is for a purpose to be hereinafter more fully described.

The apex 16 is formed with a pair of aligned openings 18 for accommodating one end of a strap or hook 19. The other end 20 of the hook is preferably U-shaped and is adapted to form the means for suspending the hanger 8 from a beam or rafter 21. It is to be understood, of course, that any desired means or practice may be employed for connecting or suspending the hanger 8 with the beam or rafter 21.

It is well known that it is the conventional practice in the curing of meat such as sausage or hams, to suspend the same from a rafter or beam in what is known as a "meat house". The curing means involved several well known processes. It has, however, been a problem to suspend the meat in a manner to prevent contact and contamination by rodents. Where the meat is suspended from a hook, rodents can reach the meat by climbing downwardly on the hooks or whatever suspending medium is employed. In accordance with the present invention, the meat hanger 8 has been so shaped and designed that, for example, a rodent attempting to reach the meat 12 by way of the beam or rafter 21 must climb down the hook 19 onto the hanger 8. This hanger, being cone-shaped and formed of a light-weight metal, presents a slippery surface which will prevent the rodent from obtaining a foothold and will, therefore, cause it to fall or slip from the hanger. In practice, a relatively large container of water is positioned directly beneath the hanger 8 so that the rodent, slipping off of the hanger 8, will fall into this container of water and be drowned. In any event, contact of the rodent with the meat and the consequent contamination thereof is substantially obviated by the present invention.

The openings 10 and hooks 11 in the base portion 17 are spaced so as to prevent contact of the various portions of meat, thereby helping to prevent the meat from spoiling, molding, or souring.

From the above description when taken in connection with the accompanying drawing, it will be readily apparent that there has been provided a meat hanger which is of relatively simple and inexpensive construction and is designed particularly for hanging meats so as to prevent contamination caused by rodents and the like coming in contact therewith. The slippery and angular surface of the hanger 8 effectively prevents the rodents from obtaining a foothold thereon.

It is obvious that many changes may be made in the details of construction without departing from the spirit of the invention as set forth in the appended claim.

I claim:

A meat hanger of the character described comprising, a body member formed from a semi-circular sheet of material and folded along a radial line with the longitudinal edges overlapped to define a cone-shaped member, the surface of said member being relatively smooth and free of obstructions, means for locking said overlapped edges, a hook carried at the apex of said body member for supporting said hanger, the lower circumferential edges of said material being formed with a series of spaced openings, and a supporting hook in each of said openings for suspending meat therefrom and retaining the same in spaced relation for curing, said hanger being cone-shaped and the material thereof being relatively smooth and free of obstructions, thereby preventing the possibility of contamination from rodents and the like attempting to reach the suspended meat by way of said hanger.

JACKSON U. TEAGUE.

REFERENCES CITED

The following references are of record in the file of this patent:

UNITED STATES PATENTS

| Number | Name | Date |
|---|---|---|
| 336,123 | Leggitt | Feb. 16, 1886 |
| 1,464,160 | Weyel | Aug. 7, 1923 |
| 1,889,002 | Palicki | Nov. 29, 1932 |
| 1,952,466 | Sjedin et al. | Mar. 27, 1934 |
| 1,995,364 | Shatkin | Mar. 26, 1935 |